United States Patent
Chang et al.

(10) Patent No.: US 6,704,312 B1
(45) Date of Patent: Mar. 9, 2004

(54) SWITCHING APPARATUS AND METHOD USING BANDWIDTH DECOMPOSITION

(75) Inventors: Cheng-Shang Chang, 112 Alley 122, Lane 648, Ming-hu Rd., Hsinchu City (TW); Wen-Jyh Chen, Hualien Hsien (TW); Hsiang-Yi Huang, Taipei (TW)

(73) Assignee: Cheng-Shang Chang, Hsinchu (TW)

( * ) Notice: Subject to any disclaimer, the term of this patent is extended or adjusted under 35 U.S.C. 154(b) by 0 days.

(21) Appl. No.: 09/569,318

(22) Filed: May 11, 2000

(30) Foreign Application Priority Data

Nov. 29, 1999 (TW) ........................... 88120778 A

(51) Int. Cl.⁷ ............................................. H04L 12/28
(52) U.S. Cl. ........................................................ 370/389
(58) Field of Search ............................... 370/351, 389, 370/395.1, 395.4, 412–418, 458, 535, 537; 340/2.1, 825, 2.2, 2.28, 14.1; 708/490, 520

(56) References Cited

U.S. PATENT DOCUMENTS

| 5,541,914 A | * | 7/1996 | Krishnamoorthy et al. | . 370/427 |
| 5,634,004 A | * | 5/1997 | Gopinath et al. | ........... 710/317 |
| 5,680,634 A | * | 10/1997 | Estes | ........................... 712/15 |
| 5,850,399 A | * | 12/1998 | Ganmukhi et al. | ......... 370/412 |
| 5,852,740 A | * | 12/1998 | Estes | ........................... 712/15 |
| 5,905,730 A | * | 5/1999 | Yang et al. | .................. 370/429 |
| 5,925,097 A | * | 7/1999 | Gopinath et al. | ........... 709/200 |
| 6,195,187 B1 | * | 2/2001 | Soref et al. | ..................... 398/9 |
| 6,341,134 B1 | * | 1/2002 | Toutain et al. | .............. 370/412 |

OTHER PUBLICATIONS

A.W.Marshall, Inequalities: Theory of Majorization and its Applications, Mathematics in Science and Engineering, vol. 143, (1979) Chapter 2, pp. 18–52.
Abhay K. Parekh, A Generalized Processor Sharing Approach To Flow Control in Integrated Services Networks: The Single–Node Case, IEEE/ACM Transactions on Netwroking, vol. 1, No. 3 (1993) pp. 344–357.
A. Hung, et al., "ATM Input–Buffered Switches With the Guaranteed–Rate Property", IEEE, (1998), pp. 331–335.
Chang, C–S et al. "On Service Guarantees FR Input Buffered Crossbar Switches: A Capacity Decomposition Approach by Birkhoff and Von Neumann"1999 Seventh International Workshop Seminar (1999) pp. 79–86.

* cited by examiner

*Primary Examiner*—David Vincent
(74) *Attorney, Agent, or Firm*—Ladas & Parry

(57) ABSTRACT

The present invention discloses a switching apparatus and method using bandwidth decomposition, appling a von Neumann algorithm, a Birkhoff theorem, a Packetized Generalized Processor Sharing algorithm, a water filling algorithm and a dynamnically calculating rate algorithm in packet switching of a high speed network. It is not necessary to speed up internally and determine a maximal matching between input ports and output ports for the switching apparatus and method using bandwidth decomposition according to the present invention, so the executing speed of a network using the present appatatus and method will be increased, and the manufacturing of the present invention can be easily implemented by current VLSI technology.

17 Claims, 3 Drawing Sheets

SWITCHING APPARATUS AND METHOD USING BANDWIDTH DECOMPOSITION

BACKGROUND OF THE INVENTION

1. Field of the Invention

The present invention relates to a packet switching apparatus and method applied in a network system, and particularly to a switching apparatus and method with rate guarantees and without internal speedup, using bandwidth decomposition.

2. Description of the Related Art

FIG. 1 is a schematic diagram of a well-known 4×4 input-buffered crossbar switch, wherein one end of the crossbar switch 11 includes a plurality of input ports, and each input port includes an input buffer 12. The input buffers 12 are used to store packets entering the input ports and prevent losing the packets due to business of the crossbar switch 11. Another end of the crossbar switch 11 is connected to a plurality of output ports. There is a controller (not shown) at the intersection of each column and each row of the crosscar switch 11 to control the direction of data flow. As shown in FIG. 1, for example, a connecting point 13 represents a corresponding controller at the on position, and the first input port is connected to the fourth output port, the second input port is connected to the second output port, the third input port is connected to the first output port, the fourth input port is connected to the third output port. If logic one represents the on connection and logic zero represents the off connection, a permutation matrix can be derived to represent the above connection pattern. If the cycle time in which a fixed number of packets are transferred by the crossbar switch 11 is divided into a plurality of time slots with a minimum of one package transferred between any input port and any output port only occurring in one time slot, then synchronization of package transference will be derived. It is a key point to find out what the connection patterns of the crossbar switch 11 are in each time slot.

Prior art uses internal speed up inside the crossbar switch 11 to reach 100% throughput. In other words, the speed of packet switching should be faster than the speed of packet transference, and the ratio of that is about 2 times or even more. Besides, the maximal matching between input packets and output port of the crossbar switch 11 should be determined within every time slot to output the greatest number of packets within every time slot. As described above, because a maximal matching algorithm is executed within every time slot, the speed of the crossbar switch 11 can not be increased to fit the application to current high speed networks.

Another kind of crossbar switch without internal speedup is disclosed by A. Hung, G. Kesidis and N. Mckeown, "ATM input-buffered switches with guaranteed-rate property," Proc. IEEE ISCC'98, Athens, pp. 331–335, 1998, which uses a weighted round robin algorithm to derive rate guarantees and 100% output utilization. The above-mentioned crossbar switch must define a frame length beforehand, and packs constant number of input packets inside the frame. When the frame size is too large, the packet delay will be increased and a lot of memory will be needed to store all the connection patterns during the cycle time of the crossbar switch. When the frame size is too small, the utilization of the bandwidth will be decreased.

As mentioned above, the crossbar switch applied in current network transmission does not completely satisfy the needs of the market.

SUMMARY OF THE INVENTION

Accordingly, an objective of the present invention is to resolve the drawbacks of needing internal speedup and low utilization of the crossbar switch as in the prior art. In order to accomplish the object, the present invention proposes a switching apparatus applied in packet switching of a network system using bandwidth decomposition. The present invention also proposes a scheduling algorithm applied in an input-buffered crossbar switch. The present invention has the following characteristics:

(1) it is not necessary to speed up inside the present switching apparatus using bandwidth decomposition;
(2) it is not necessary to determine a maximal matching between input packets and output ports within every time slot;
(3) it is not necessary to define a frame length;
(4) the switching apparatus using bandwidth decomposition according to the present invention can reach 100% utilization of output rate;
(5) the present switching apparatus using bandwidth decomposition can afford quality of service (QoS) in network transmission, such as packet delay, queue length of input buffers, etc;
(6) the present switching apparatus using bandwidth decomposition affords different service qualities for clients with different service grades;
(7) In practical application, the present switching apparatus using bandwidth decomposition can be implemented by hardware circuit, especially being formed by a single chip and embedding the chip on the motherboard of a switching machine, such as Hub, Switch, etc.

The present invention proposes a switching apparatus applied in packet switching of a network system using bandwidth decomposition. An element $r_{i,j}$ in the rate matrix $R=(r_{i,j})$ represents the input rate assigned to the traffic from the i-th input port to the j-th output port of an input-buffered N×N crossbar switch. The apparatus aspect of the present invention mainly comprises a rate-measuring mechanism, a plurality of input ports, a crossbar switch and a processing mechanism. The rate-measuring mechanism is used to dynamically measure the input rate of the present switching apparatus. The plurality of input ports, connected to said rate-measuring mechanism, include a plurality of storing devices for storing input packets. The crossbar switch, connected to said plurality of input ports, is used to transfer said plurality of input packets to the plurality of output ports of said switching apparatus using bandwidth decomposition. The processing mechanism, connected to said rate-measuring mechanism, is used to transform said rate matrix into connection patterns of said crossbar switch in each time slot of the cycle time.

The present invention regarding method mainly comprises the following steps: the step of using a von Neumann algorithm to transform the rate matrix R= of a N×N input-buffered crossbar switch to a doubly stochastic matrix $\tilde{R}$; the step of using a Birkhoff theorem to decompose said doubly stochastic matrix into a linear combination of a plurality of permutation matrices, all said plurality of permutation matrices corresponding to a connection pattern of said crossbar switch; and the step of using a Packetized Generalized Processor Sharing algorithm to set up a connection pattern of said crossbar switch in each time slot of the cycle time.

BRIEF DESCRIPTION OF THE DRAWINGS

The invention will be described according to the appended drawings in which.

PREFERRED EMBODIMENT OF THE PRESENT INVENTION

Figure 1:
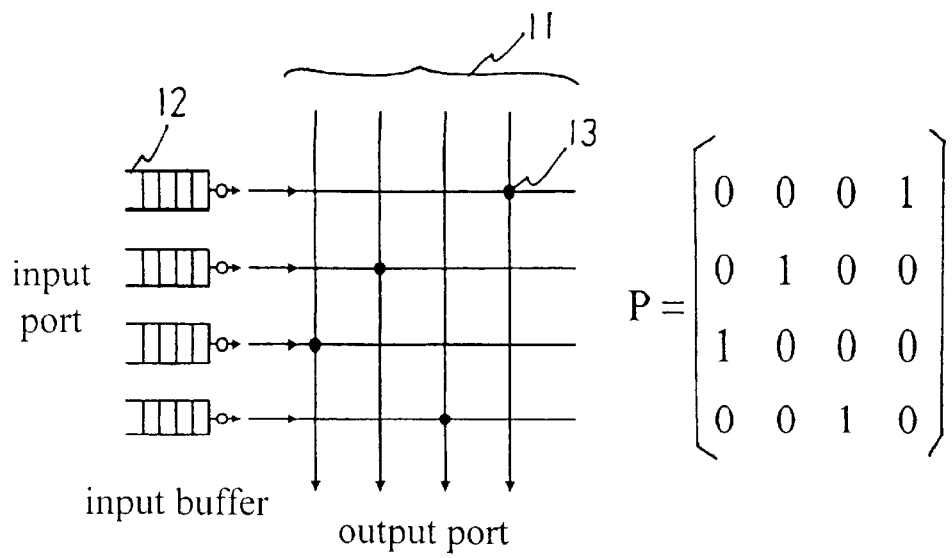
FIG. 1 is a schematic diagram of a well-known 4×4 input-buffered crossbar switch.

For convenience, let $r_{i,j}$ represent an input rate from the i-th input port to the j-th output port in a N×N input-buffered crossbar switch, and have the following relationship:

$$\sum_{i=1}^{N} r_{i,j} \leq 1, \text{ for every } j \quad (1)$$

$$\sum_{j=1}^{N} r_{i,j} \leq 1, \text{ for every } i \quad (2)$$

Inequality (1) and inequality (2) are called "no overbooking conditions", and mean that neither the total rate to an output port nor the total rate coming out from an input port can be larger than one.

Let matrix $R=(r_{i,j})$ represent a rate matrix. If the matrix $R=(r_{i,j})$ satisfies inequality (1) and inequality (2), the matrix R is called "doubly substochastic matrix". If the matrix $R=(r_{i,j})$ satisfies the equal conditions of inequality (1) and inequality (2), the matrix R is called "doubly stochastic matrix".

If a demanded-rate matrix satisfies the definition of a doubly substochastic matrix, all input packets will be sent to the corresponding output port by the crossbar switch 11 with no extra latency. A doubly stochastic matrix is regarded as the supplied-rate matrix of the crossbar switch 11 relative to the demanded-rate matrix. Every element of the doubly stochastic matrix is not less than the element at the same index of the doubly substochastic matrix, and that assures the rate supply of the crossbar switch 11 is not less than the rate demand, and can supply a rate guarantee to satisfy the demand of all input ends.

The present invention uses the well-known von Neumann theorem and algorithm to find out a doubly stochastic matrix from a doubly substochastic matrix. The von Neumann theorem can be seen in "Inequalities: Theory of Majorization and Its Applications," by Albert W. Marshall and Ingram Olkin, ACADEMIC PRESS, 1979.

von Neumann Theorem

If a matrix $R=(r_{i,j})$ is doubly substochastic, then there exists a doubly stochastic matrix $\tilde{R}=(\tilde{r}_{i,j})$ such that $r_{i,j} \leq \tilde{r}_{i,j}$, for every i and j.

This can be constructed by the following algorithm:

Algorithm 1: von Neumann Algorithm (a1) If the sum of all the elements in the rate matrix R is less than N, then there exists a specific element (i, j), and the sum of all the elements in the same row as the specific element and the sum of all the elements in the same column as the specific element are less than one.

(a2) Let $\epsilon=1-\max[\Sigma_n r_{i,n}, \Sigma_m r_{m,j}]$, wherein $\epsilon$ is the value of subtracting one from the larger one between the i-th row sum and the j-th column sum of the rate matrix. Adding the value $\epsilon$ to the element having index (i, j) in the rate matrix to generate a new matrix $R_1$. Then in $R_1$, the number of row sums and column sums that are strictly smaller than one is at least one less than that in the rate matrix R.

(a3) Repeat step (a1) and step (a2) until a doubly stochastic matrix $\tilde{R}$ is obtained.

After finding out a doubly stochastic matrix $\tilde{R}$, a Birkhoff theorem as follows is used to decompose the doubly stochastic matrix $\tilde{R}$ into a linear combination of a plurality of permutation matrices. The sum of coefficients in the linear combination is one, and every permutation matrix is corresponding to a connection pattern of the crossbar switch 11. The Birkhoff theorem can be seen in "Inequalities: Theory of Majorization and Its Applications," by Albert W. Marshall and Ingram Olkin, ACADEMIC PRESS, 1979.

Birkhoff Theorem

For a doubly stochastic matrix $\tilde{R}$, there exists a set of positive value $\phi_k$ and a set of permutation matrix $P_k$ such that $$\tilde{R} = \sum_k \phi_k P_k.$$

Let e be a column vector with all elements being one. As $\tilde{R}$ is doubly stochastic, an inference that $$e = \tilde{R}e = \sum_k \phi_k (P_k e) = \left(\sum_k \phi_k\right) e$$

can be obtained and shows that $$\sum_k \phi_k = 1.$$

Algorithm 2: Deduced from Birkhoff Theorem (b1) Find out a set of column indices $(i_1, i_2, \ldots, i_N)$ from the permutations of $(1,2,3, \ldots, N)$ for a doubly stochastic matrix $\tilde{R}$, such that all the corresponding elements $\tilde{r}_{k,i_k}$ of the doubly stochastic matrix are larger than zero, wherein $k=1,2, \ldots, N$.

(b2) Define a matrix $R_1$ whose value is equal to $\tilde{R} - \phi_1 P_1$, wherein $P_1$ is the permutation matrix corresponding to $(i_1, i_2, \ldots, i_N)$, $\phi_1 = \min_{1 \leq k \leq N}[\tilde{r}_{k,i_k}]$, being the smallest value among $\tilde{r}_{k,i_k}$, and $k=1,2, \ldots, N$;

(b3) if $\phi_1$ is equal to one and $R_1 e = \tilde{R}e - P_1 e = 0$, wherein 0 represents a column vector whose all elements are zero, then matrix $R_1$ is a zero matrix and the decomposition operation is ended;

(b4) if $\phi_1$ is less than one, then generate a doubly stochastic matrix $$\frac{R_1}{1-\phi_l},$$

and return to step (b1) to continue the decomposition operation.

Besides, for the supplied-rate matrix $\tilde{R}$ of the crossbar switch 11, the connection pattern has at most $N^2-2N+2$ kinds according to the verification of the Birkhoff theorem.

In practical application, the step (b4) of the Algorithm 2 can be further improved to omit the step of generating a doubly stochastic matrix $$\frac{R_1}{1-\phi_1},$$

directly entering into step (b1) instead. After step (b2) of Algorithm 2, the sums of every row and column are left $1-\phi_1$. Although a doubly stochastic matrix is obtained by dividing the matrix by $1-\phi_1$ and the next coefficient has been amplified $$\frac{R_1}{1-\phi_1}$$

times, the coefficients after decomposition shall be multiplied by $1-\phi_1$ to derive the real coefficients, and the conclusion is the same with directly entering into step (b1).

After obtaining the linear combination of the permutation matrices with the supply rate (or connection patterns) of the crossbar switch, how to set up thee connection patterns in one time slot of the cycle time T of the crossbar switch 11 and how to control the packet delay and queue length are then determined. To reach the purpose, the present invention uses a Packetized Generalized Processor Sharing algorithm, also called PGPS for the timing scheduling of the crossbar switch 11. The Packetized Generalized Processor Sharing algorithm can be seen in A. K. Parekh and R. G. Gallager, "A Generalized Processor sharing approach to flow control in integrated service networks: the single-node case," IEEE/ACM Transactions on Networking, Vol. 1, pp.344–357, 1993.

Algorithm 3: Packetized Generalized Processor Sharing Algorithm (PGPS)

(c1) Assume that the Algorithm 2 finds out K types of permutations, and giving each permutation a token;

(c2) In the first time slot of the cycle time, each of the K permutations generates the first token, and derives a virtual finishing time of the first token of the i-th permutation as $$F_k^1 = \frac{1}{\phi_k},$$

wherein $\phi_k$ is the corresponding coefficient of linear combination of the plurality of permutation matrices, and sort these K tokens in an increasing order of the virtual finishing time.

(c3) A permutation matrix with the smallest virtual finishing time has the right to be set up as the connection pattern of the crossbar switch in the time slot; and (c4) The k-th token in the l-th time slot is generated by the crossbar switch after the corresponding connection pattern of the k-th permutation matrix in the (l-1)-th time slot is set up. The virtual finishing time of the k-th token of the l-th time slot is as $$F_k^l = F_k^{l-1} + \frac{1}{\phi_k},$$

and the virtual finishing time of other K−1 tokens remains their old values. The virtual finishing time of the k-th token of the l-th time slot is inserted to the sorted token list and repeats from step (c3).

An example of a 4×4 crossbar switch is given to illustrate the whole process of the crossbar switch 11, and considers the rate matrix R as follows:

$$R = \begin{bmatrix} 0 & 0.3 & 0.2 & 0.4 \\ 0.2 & 0.3 & 0 & 0.2 \\ 0.4 & 0.1 & 0.3 & 0 \\ 0.2 & 0 & 0.2 & 0.3 \end{bmatrix}$$

First, the elements in positions (1,2) (2,1) (2,2) (3,2) (3,3) (4,3) (4,4) are changed according to Algorithm 1 and obtain a doubly stochastic matrix $\tilde{R}$ as follows:

$$\tilde{R} = \begin{bmatrix} 0 & 0.4 & 0.2 & 0.4 \\ 0.4 & 0.4 & 0 & 0.2 \\ 0.4 & 0.2 & 0.4 & 0 \\ 0.2 & 0 & 0.4 & 0.4 \end{bmatrix}$$

Secondly, the matrix $\tilde{R}$ is decomposed by Algorithm 2 into a linear combination of a plurality of permutation matrices, $\tilde{R} = P_1 \times \phi_1 + P_2 \times \phi_2 + P_3 \times \phi_3 + \ldots$ $$\tilde{R} = \begin{bmatrix} 0 & 1 & 0 & 0 \\ 1 & 0 & 0 & 0 \\ 0 & 0 & 1 & 0 \\ 0 & 0 & 0 & 1 \end{bmatrix} + 0.4 \begin{bmatrix} 0 & 0 & 0 & 1 \\ 0 & 1 & 0 & 0 \\ 1 & 0 & 0 & 0 \\ 0 & 0 & 1 & 0 \end{bmatrix} + 0.2 \begin{bmatrix} 0 & 0 & 1 & 0 \\ 0 & 0 & 0 & 1 \\ 0 & 1 & 0 & 0 \\ 1 & 0 & 0 & 0 \end{bmatrix}$$

wherein $\phi_1 = \phi_2 = 0.4$, $\phi_3 = 0.2$ and $$P_1 = \begin{bmatrix} 0 & 1 & 0 & 0 \\ 1 & 0 & 0 & 0 \\ 0 & 0 & 1 & 0 \\ 0 & 0 & 0 & 1 \end{bmatrix}, P_2 = \begin{bmatrix} 0 & 1 & 0 & 0 \\ 1 & 0 & 0 & 0 \\ 0 & 0 & 1 & 0 \\ 0 & 0 & 0 & 1 \end{bmatrix}, P_3 = \begin{bmatrix} 0 & 0 & 1 & 0 \\ 0 & 0 & 0 & 1 \\ 0 & 1 & 0 & 0 \\ 1 & 0 & 0 & 0 \end{bmatrix}$$

In the first time slot of the cycle time T, the first tokens of the three permutation matrices $P_1$, $P_2$ and $P_3$ will be generated by the crossbar switch 11, and their corresponding virtual finishing times are $$F_1^1 = \frac{1}{\phi_1} = 2.5,$$

$$F_2^1 = \frac{1}{\phi_2} = 2.5, \quad F_3^1 = \frac{1}{\phi_3} = 5,$$

respectively. The sorting result of the above virtual finishing time is $F_1^1 = F_2^1 < F_3^1$. After that, the connection pattern of the crossbar switch 11 is set up according to the permutation matrix $P_1$, and then the virtual finishing time of the token of the permutation matrix $P_1$ is modified to $$F_1^2 = F_1^1 + \frac{1}{\phi_1} = 5.$$

The virtual finishing times of the tokens of the permutation matrices $P_2$ and $P_3$ are not changed, and still are $F_2^1 = 2.5$ $F_3^1 = 5$. Depending on the rules, the virtual finishing times of the tokens of the three permutation matrices are sorted and the sorting result is $F_2^1 < F_3^1 = F_1^2$. In the second time slot, the connection pattern of the crossbar switch 11 is set up according to the permutation matrix $P_2$, the virtual finishing time is modified to $$F_2^2 = F_2^1 + \frac{1}{\phi_2} = 5,$$

and the virtual finishing times of the permutation matrices $P_1$ and $P_3$ are not changed, still being $F_3^1=5$ and $F_1^2=5$. Depending on the rules, the virtual finishing time of the tokens of the three permutation matrices are sorted and the sorting result is $F_1^2=F_2^2=F_3^1$. In the third, fourth and fifth time slot, the connection patterns of the crossbar switch 11 are set up according to the permutation matrices $P_1$, $P_2$ and $P_3$. When the fifth time slot is finished, the virtual finishing times of the tokens of the three permutation matrices are $F_1^3=F_2^3=7.5$ and $F_3^2=10$. The three virtual finishing times are sorted, and the sorting result is $F_1^3=F_2^3<F_3^2$. The connection patterns of the crossbar switch 11 in each time slot are determined sequentially based on the Algorithm 3. According to the above examples, the ratios $\phi_1:\phi_2:\phi_3$ of the three kinds of permutations appear as 4:4:2=2:2:1.

If the demand of the traffic flow is known in advance, Algorithm 1 and Algorithm 2 are only computed once and determine the connection pattern of the crossbar switch, and then on-line computing by the Algorithm 3. On the condition of the demand flow invariable, Algorithm 1 and Algorithm 2 are not necessary to recompute. But sometimes the demand flow is changed after a period of time or the input flow has a burst behavior. In other words, the input flow enters the crossbar switch 11 densely for a period of time. Under this circumstance, if the connection patterns of the crossbar switch are determined by average traffic flow and through Algorithm 1 to 3, the queue length of the input buffers will be increased rapidly during a short time. A means of dynamically calculating rate is used to resolve the problem, which calculates the flow variance of the crossbar switch during one cycle time for generating a new flow demand, and then determines the connection patterns of each time slot in the cycle time by Algorithms 1 to 3.

A possible way to implement the dynamically calculating rate is as follows:

$$r_{i,j}(n+2) = (1-\alpha(n))r_{i,j}(n+1) + \alpha(n)\left(\frac{A_{i,j}(nT) - A_{i,j}((n-1)T)}{T}\right) \quad (3)$$

$$r_{i,j}(0) = r_{i,j}(1) = \frac{1}{N} \quad (4)$$

wherein $0<\alpha(n)<1$, $n \geq 1$ and n represents times of the dynamically calculating rate; $r_{i,j}(0)$ and $r_{i,j}(1)$ are initial values of the input rate of the crossbar switch; T is the cycle time calculating input rate of the crossbar switch 11; $A_{i,j}(nT)-A_{i,j}((n-1)T)$ is the packet number from the i-th input port to the j-th output port of the crossbar switch 11 during time (n−1)T to time nT, and $$\frac{A_{i,j}(nT) - A_{i,j}((n-1)T)}{T}$$

is the input traffic rate of the crossbar switch 11 during time (n−1)T to time nT; $\alpha(n)$ is a parameter adjusting effect of input rate, and if the variance of the traffic flow of the crossbar switch 11 is large, $\alpha(n)$ should be amplified to adjust the rate being estimated, and if the input rate is smooth, then $\alpha(n)$ should be scaled down; if $\alpha(n)=n/1$, the input rate estimated will be the sample mean of the real input rate.

Figure 2:
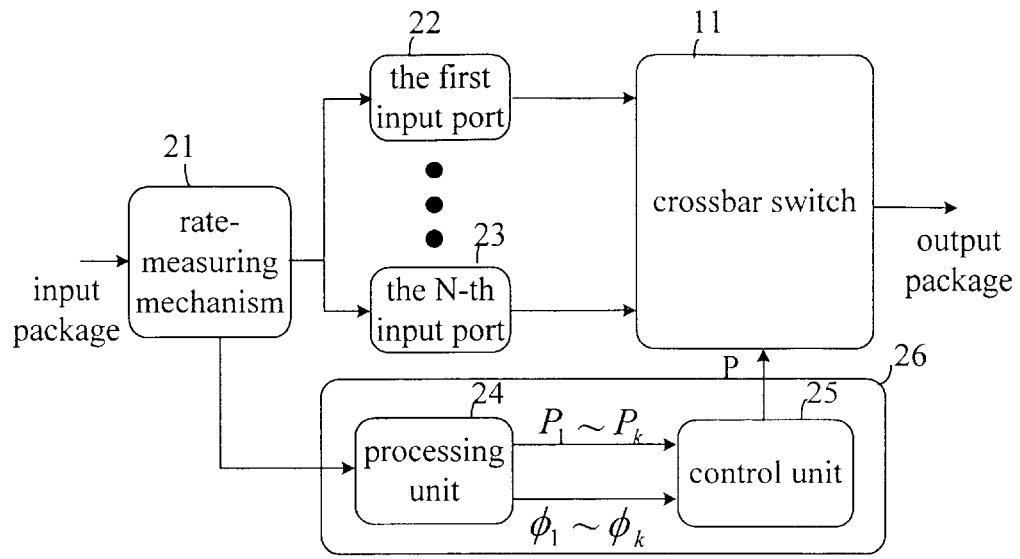
FIG. 2 is a schematic diagram of the switching apparatus using bandwidth decomposition according to a preferred embodiment of the present invention.

FIG. 2 is a schematic diagram of the switching apparatus using bandwidth decomposition according to a preferred embodiment of the present invention. The present invention comprises a rate-measuring mechanism 21, a first input port 22 to N-th input port 23, a processing mechanism 26 and a crossbar switch 11. The rate-measuring mechanism 21 is used to measure the input flow, and based on equation (3) and (4) to complete the steps of the dynamically calculating rate. Each of the first input port 22 to the N-th input port 23 contains a queue and connects to the rate-measuring mechanism 21 for buffering input packets. The crossbar switch 11, connected to the plurality of input ports 22, 23, is used to transfer the plurality of input packets to the plurality of output ports. The processing mechanism 26, connected to the rate-measuring mechanism 21, is used to generate the only connection pattern for the crossbar switch 11 in one time slot according to Algorithms 1 to 3. The processing mechanism 26 includes a processing unit 24 and a control unit 25. The processing unit 24 generates permutation matrices $P_1$ to $P_k$ and the corresponding coefficients of linear combination $\phi_1$ to $\phi_k$ according to Algorithms 1 to 2. The control unit 25 receives the permutation matrices $P_1$ to $P_k$ and the corresponding coefficients of linear combination $\phi_1$ to $\phi_k$ from the processing unit 24, and according to Algorithm 3 to generate the only permutation matrix P in one time slot. The processing mechanism 26 can be implemented by software or hardware, and because the algorithm of the present invention is very regular and symmetric, no matter the implementation is hardware or software is very easy and flexible. The permutation matrix P outputted from the processing mechanism 26 is used to control the controller on each intersection of the rows and columns of the crossbar switch 11 (not shown). If one element of the permutation matrix P is logic one, that represents an input packet that can reach the corresponding output port. If one element of the permutation matrix P is logic zero, that represents an input packet that can not reach the corresponding output port.

Figure 3:
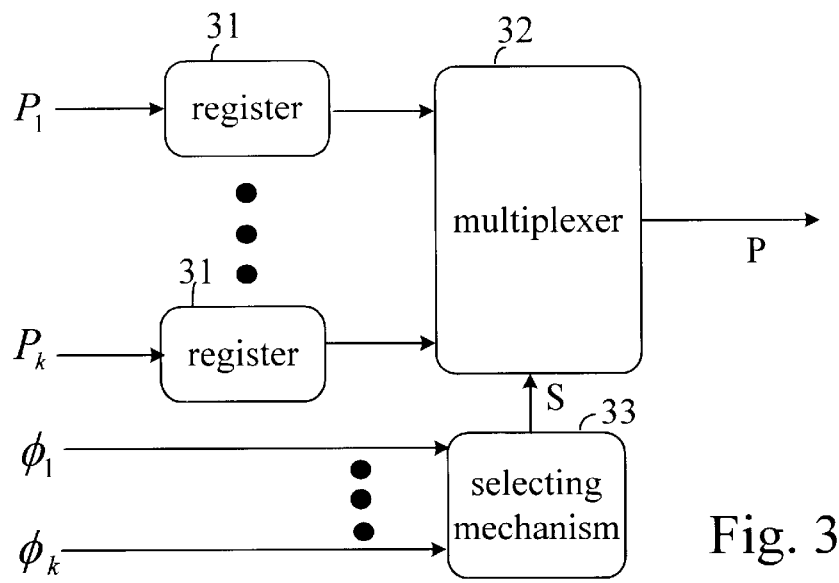
FIG. 3 is a structure diagram of the control unit in FIG. 2 according to a preferred embodiment of the present invention.

FIG. 3 is a structure diagram of the control unit in FIG. 2 according to a preferred embodiment of the present invention. The structure comprises a plurality of registers 31, a selecting mechanism 33 and a multiplexer 32. The plurality of registers 31 are used to store the plurality of permutation matrices $P_1$ to $P_k$ generated from the processing unit 24. A control signal S as the selecting signal of the multiplexer 32 for selecting the only permutation matrix between $P_1$ to $P_k$ in one time slot is generated by inputting the coefficients $\phi_1$ to $\phi_k$ of the linear combination to the selecting mechanism 33.

Figure 4:
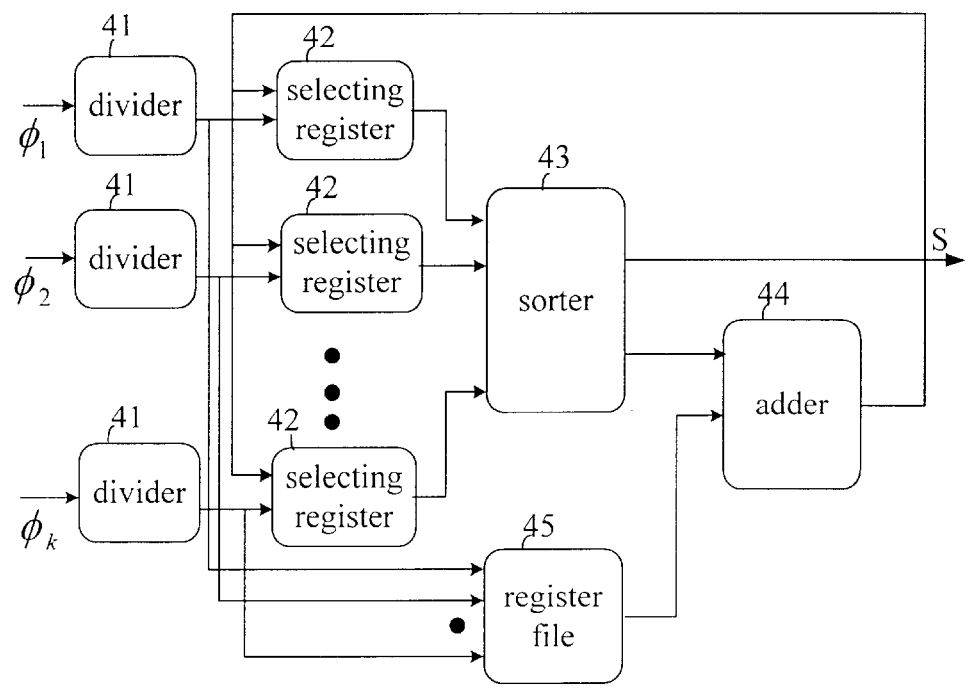
FIG. 4 is a structure diagram of the selecting mechanism in FIG. 3 according to a preferred embodiment of the present invention.

FIG. 4 is a structure diagram of the selecting mechanism in FIG. 3 according to a preferred embodiment of the present invention. The structure comprises a plurality of dividers 41, a plurality of selecting registers 42, a register file 45, a sorter 43 and an adder 44. The plurality of dividers 41 are used to generate the reciprocal of the coefficients $\phi_1$ to $\phi_k$ as virtual finishing times. During cycle time T of the crossbar switch 11, every virtual finishing time is stored in the register file 45. In the first time slot of cycle time T, the virtual finishing times outputted from the plurality of dividers 41 are stored in the plurality of selecting registers 42. The sorter 43, connected to the plurality of selecting registers 42, selects the smallest virtual finishing time and outputs the series number S of the selecting register containing the smallest virtual finishing time. The adder 44 is used to add the smallest virtual finishing time selected by the sorter 43 and the virtual finishing time stored in the register with a series number S of the register file 45, and feeds the result to the corresponding selecting register 42 with series number S.

Figure 5:
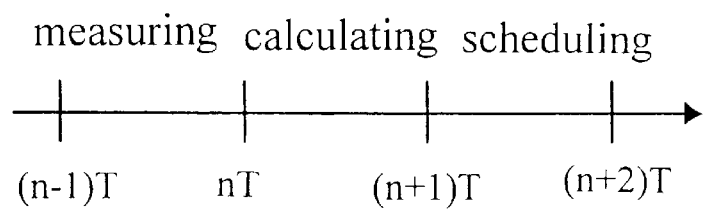
FIG. 5 is a timing diagram according to the present invention.

FIG. 5 is a timing diagram according to the present invention, wherein the steps of the present invention can be divided into a measuring step, calculating step and scheduling step. In the measuring step, the input flow during time (n−1)T to time nT is measured by equation (3) and (4), and a demanded-rate matrix R is obtained. In the calculating step, a permutation $P_k$ and weight $\phi_k$ are obtained by Algorithms 1 and 2, and cycle time T including a plurality of time slots, must be long enough to execute Algorithm 1 and 2 by the present apparatus. In the scheduling step, the connection pattern of the crossbar switch 11 in each time slot is determined by Algorithm 3 for on-line scheduling procedure.

As mentioned above, the characteristic of the present invention will is be illustrated as follows:

1. If the no overbooking conditions of inequality (1) and (2) are satisfied, an equation $C_{i,j}(t)-C_{i,j}(s) \geq r_{i,j}(t-s)-N^2+2N-2$, is guaranteed by Algorithms 1 to 3 as scheduling policies, wherein $C_{i,j}(t)-C_{i,j}(s)$ is the cumulative number of time slots that are assigned to the traffic from the i-th input port to the j-th output port during time t to time s, $r_{i,j}$ is the rate from the i-th input port to the j-th output port; N is the number of input ports of the crossbar switch 11.
2. It is not necessary to speed up inside the crossbar switch 11, and all packets switched are completed during one time slot.
3. If the no overbooking conditions of inequality (1) and (2) are satisfied by the traffic flow through the crossbar switch 11, the present invention will propose a supplied-rate matrix $\tilde{R}$ being not less than the demanded-rate matrix R to fit the demand of traffic flow. Therefore, the present invention is a "uniformly good" method, and can reach 100% output rate.
4. It is not necessary to determine the maximal matching between input ports and output ports in each time slot according to Algorithms 1 to 3. If the demanded-rate matrix R does not change in the cycle time of measuring traffic flow, Algorithms 1 and 2 are not necessary to recompute and only Algorithm 3 is necessary to on-line compute.
5. The algorithms of the present invention are not complex in computing, and most contain basic matrix operations. By the VLSI technology nowadays, the present invention can be implemented easily and widespreadly used in the business.

In other applications, the present invention can supply different service grades. For example, the service grades can be classified into guaranteed-rate service and best-effort service. In guaranteed-rate service, the clients first request their necessity, and then the crossbar switch 11 must satisfy the request from the clients and support the rate guarantees. In best-effort service, the crossbar switch 11 first supports the rate guarantees, and allocates the residual bandwidth to clients. Apparently, the clients with guaranteed-rate service have higher priority than client s with best-effort service.

First, the input rate through the crossbar switch 11 is measured by the dynamically calculating rate of equations (3) and (4). When the input rate satisfies the no overbooking conditions of inequalities (1) and (2), the present invention can support a service that satisfies the demand of all input rates. Secondly, Algorithms 1 to 3 are executed directly, and the rate guarantees and rate fairness for all clients are obtained. But when the no overbooking conditions are not satisfied with all input rates, the crossbar switch 11 gives a higher priority to the clients with guaranteed-rate service. In other words, the crossbar switch 11 allocates the element (represents bandwidth) of R to the clients with guaranteed-rate service, and leaves the residual bandwidth to the clients with best-effort service. In other words, the present apparatus first sets up the traffic flow of the clients with the highest priority to let the clients gain their demand bandwidth, and after that, a method like water filling is used to allocate the residual bandwidth to others.

Figure 6:
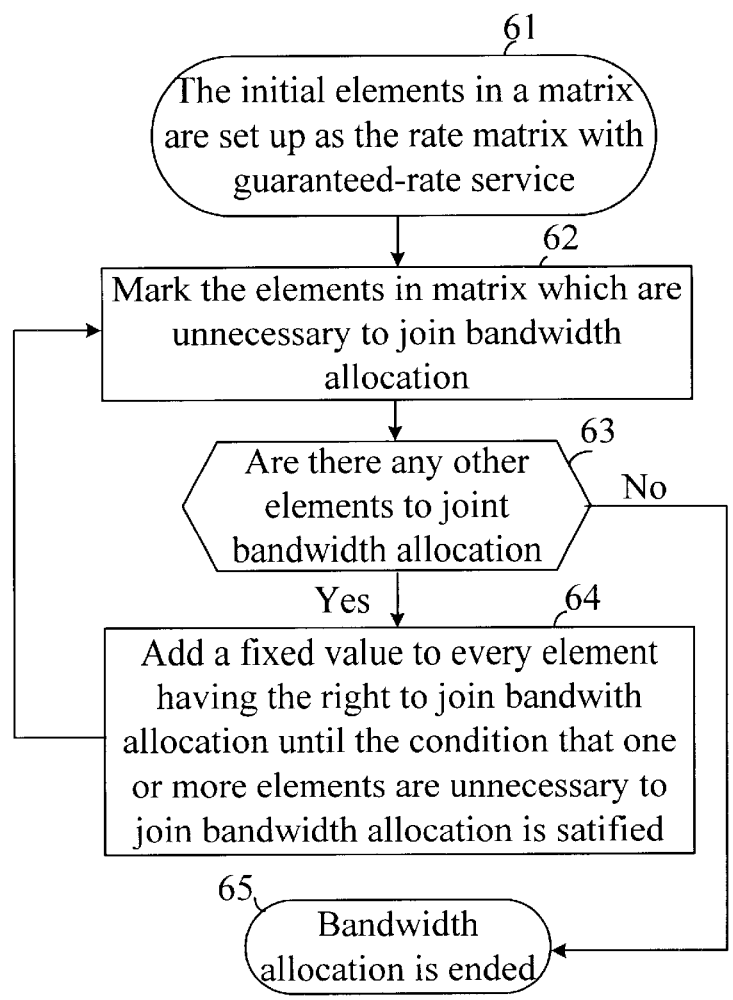
FIG. 6 is a flow diagram of a water filling procedure for the switching apparatus using bandwidth decomposition according to the present invention.

FIG. 6 is a flow diagram of a water filling procedure for the switching apparatus using bandwidth decomposition according to the present invention. In step 61, the initial elements in a matrix R are set up to the rate matrix with guaranteed-rate service. In step 62, the elements unnecessary to join bandwidth allocation in the matrix are marked. In step 63, whether there are any elements to join bandwidth allocation is determined. If the answer is no, the procedure enters step 65 and the bandwidth allocation is ended. If the answer of step 63 is yes, the procedure enters step 64 and adds the elements having the right to join bandwidth allocation by a constant until one or more elements are not necessary to join bandwidth allocation again. Generally speaking, the value of every element in the matrix R is increased slowly until overflowing. The elements having overflowed in the matrix are not allocated any bandwidth again, and the other elements continuously increase in bandwidth allocation procedure until all elements in the matrix stop bandwidth allocation. An element in the matrix having overflowed means that the sum of the column at which the element is situated is one, or the elements in the matrix are satisfied with the rate demand of both service grades. It is unnecessary to consider the row sum constrain, because every input port has at most one input packet in each time slot, and the row sum will not violate the no overbooking conditions of inequality (2). Therefore, whether the column sum violates inequality (1) is only considered. After finishing the water filling procedure, Algorithms 1 to 3 are proceeded for rate guarantees and rate fairness. By the two services mentioned above, the output flow of the crossbar switch 11 will reach maximum under the condition of guaranteed-rate service.

A connection pattern of the crossbar switch 11 will be set up in each time slot. There is a constrain that when packets stored in different input buffers but destinated to the same output ports, only one packet can not be transmitted in one time slot. The constraint will create low throughput caused by head of line blocking, also called HOL blocking. The cause of HOL blocking is the FIFO (single First In First Out) structure of input buffers. In other words, the packets stored in the input buffers are sequentially transmitted according to the storing time, and the latter packets must stay in the input buffer, even when the latter packets are destinated to different output ports from the prior packets. The situation will largely reduce the utilization of the crossbar switch 11. The present invention uses the method of virtual output queuing, also called VOQ, to resolve the above questions, that every input buffer is divided into 2N virtual output queues implemented by a memory means. The traffic flows with different service grades are stored in different virtual output queues respectively, depending on the output ports the packets output to but not according to the output ports only, wherein the n-th virtual output queue stores the packets transmitted to the n-th output port ($1 \leq n \leq N$). When a packet enters one input port, the packet is stored in the corresponding virtual output queue according to the output port the packet transmitted to. In other words, the memory address of the virtual output queue is recorded. The packets outputted can be read out by polling the memory means, and the disadvantage of packet blocking described above will not happen again.

The above-described embodiments of the present invention are intended to be illustrated only. Numerous alternative embodiments may be devised by those skilled in the art without departing from the scope of the following claims.

What is claimed is:

1. A switching method using bandwidth decomposition, applied in packet switching of a network system, comprising the following steps:
    (a) using a von Neumann algorithm to transfer a rate matrix R a N×N input-buffered crossbar switch to a doubly stochastic matrix $\tilde{R}$, wherein an element $r_{i,j}$ of said rate matrix represents the rate from the i-th input port to the j-th output port of said crossbar switch, both i and j are not less than one and not larger than N, and N is the number of the input ports of said crossbar switch;
    (b) using a Birkhoff theorem to decompose said doubly stochastic matrix into a linear combination of a plurality of permutation matrices, and each one of said plurality of permutation matrices corresponding to a connection pattern of said crossbar switch; and
    (c) using a Packetized Generalized Processor Sharing algorithm to set up a connection pattern of said crossbar switch in each time slot of a cycle time, wherein the cycle time represents the time needed to transmit a fixed number of input packets.

2. The method of claim 1, further comprising a step for dynamically calculating rate variations of said crossbar switch before step (a).

3. The method of claim 2, wherein if the rate outputted from an output port or the rate inputted from an input port of said crossbar switch are larger than one, then a water-filling algorithm is added to allocate the residual bandwidth between the step of the dynamically calculating rate variations and step (a).

4. The method of claim 1, wherein step (a) further comprises the following steps:
    (a1) if the sum of all elements in the rate matrix R is less than N, then there exists a specific element, and the sum of all elements in the same row as the specific element and the sum of all elements in the same column as the specific element are less than one; and finding out the specific element;
    (a2) defining $\epsilon=1-\max[\Sigma_n r_{i,n}, \Sigma_m r_{m,j}]$, wherein $\epsilon$ is the value of subtracting one from the larger one between the i-th row sum and the j-th column sum of the rate matrix R adding the value $\epsilon$ to the element having index (i, j) in the rate matrix to generate a new matrix $R_1$; the number of row sums and column sums in $R_1$ that are strictly smaller than one is at least one less than that in the rate matrix R and
    (a3) repeating step (a1) and step (a2) until a doubly stochastic matrix $\tilde{R}$ is obtained.

5. The method of claim 1, wherein step (b) comprises the is following steps:
    (b1) Find out a set of column indices $(i_1, i_2, \ldots, i_N)$ from the permutations of $(1,2,3,\ldots,N)$ for a doubly stochastic matrix $\tilde{R}$ such that all the corresponding elements $\tilde{r}_{k,i_k}$ of the doubly stochastic matrix are larger than zero, wherein $k=1,2,\ldots,N$;
    (b2) defining a permutation $R_1$ whose value is equal to $\tilde{R}-\phi_1 P_1$, wherein $P_1$ is the permutation corresponding to $(i_1, i_2, \ldots, i_N)$, $\phi_1 = \min_{1 \le k \le N}[\tilde{r}_{k,i_k}]$, $\phi_1$ is the smallest value among $\tilde{r}_{k,i_k}$, and $k=1,2,\ldots,N$;
    (b3) if $\phi_1$ is equal to one and $R_1 e = \tilde{R}e = P_1 e = 0$, wherein 0 represents a column vector whose elements are zero, then matrix $R_1$ is a zero matrix and the decomposition operation is ended; and
    (b4) if $\phi_1$ is less than one, then generating a doubly stochastic matrix $$\frac{R_1}{1-\phi_1},$$

and returning to step (b1) to continue the decomposition operation.

6. The method of claim 1, wherein step (b) comprises the following steps:
    (b1) Find out a set of column indices $(i_1, i_2, \ldots, i_N)$ from the permutations of $(1,2,3,\ldots,N)$ for a doubly stochastic matrix $\tilde{R}$ such that all the corresponding elements $\tilde{r}_{k,i_k}$ of the doubly stochastic matrix are larger than zero, wherein $k=1,2,\ldots,N$;
    (b2) defining a permutation $R_1$ whose value is equal to $\tilde{R}-\phi_1 P_1$, wherein $P_1$ is the permutation corresponding to $(i_1, i_2, \ldots, i_N)$, $\phi_1 \min_{1 \le k \le N}[\tilde{r}_{k,i_k}]$, $\phi_1$ is the smallest value among $\tilde{r}_{k,i_k}$, and $k=1,2,\ldots,N$;
    (b3) if $\phi_1$ is equal to one and $R_1 e = \tilde{R}e = P_1 e = 0$, wherein 0 represents a column vector whose all elements are zero, then matrix $R_1$ is a zero matrix and the decomposition operation is ended; and
    (b4) if $\phi_1$ is less than one, then returning to step (b1) to continue the decomposition operation.

7. The method of claim 1, wherein step (c) comprises the following steps:
    (c1) assuming that the Birkhoff theorem finds out K types of permutations, and giving each permutation a token;
    (c2) in the first time slot of the cycle time, each of the K permutations generating the first token, and deriving a virtual finishing time of the first token of the i-th permutation as $$F_k^1 = \frac{1}{\phi_k},$$

wherein $\phi_k$ is the corresponding coefficient of the linear combination of the plurality of permutation matrices, and sorting the virtual finishing times of these K tokens in an increasing order;
    (c3) a permutation matrix with the smallest virtual finishing time having the right to be set up as the connection pattern of the crossbar switch in the corresponding time slot; and
    (c4) the k-th token in the l-th time slot being generated by the crossbar switch after the corresponding connection pattern of the k-th permutation matrix of the (l-1)-th time slot being set up; the virtual finishing time of the k-th token of the l-th time slot being as $$F_k^l = F_k^{l-1} + \frac{1}{\phi_k},$$

and the virtual finishing time of other K-1 tokens remaining their old values; the virtual finishing time of the k-th token of the l-th time slot being inserted to the sorted token list and repeating from step (c3).

8. The method of claim 2, wherein the step for said dynamically calculating rate is implemented by the following equation:

$$r_{i,j}(n+2) = (1-\alpha(n))r_{i,j}(n+1) + \alpha(n)\left(\frac{A_{i,j}(nT)-A_{i,j}((n-1)T)}{T}\right)$$

$$r_{i,j}(0) = r_{i,j}(1) = \frac{1}{N}$$

wherein $0<\alpha(n)<1$, and $n \ge 1$, n represents the times of the dynamically calculating rate of said crossbar switch; $\alpha(n)$ represents a parameter adjusting effect of the input rate, and the more variable the input rate is, the larger the parameter $\alpha(n)$ should be adjusted, and the more smooth the input rate is, the smaller the parameter $\alpha(n)$ should be adjusted; $r_{i,j}(0)$ and $r_{i,j}(1)$ represent the values of the initial input rates of said crossbar switch; T represents the cycle time; $A_{i,j}(nT)-A_{i,j}((n-1)T)$ represents the packet number from the i-th input port to the j-th output port during time (n-1)T to time nT.

9. The method of claim 3, wherein said water filling algorithm comprises the following steps:
- (9.1) the initial elements of a matrix being set up as the rate matrix with guaranteed-rate service, and said guaranteed-rate service representing a fixed rate having to be remained from each input port to the corresponding output port;
- (9.2) marking the elements unnecessary to join the bandwidth allocation in said rate matrix;
- (9.3) determining if there are other elements to join the bandwidth allocation;
- (9.4) if the answer in step (9.3) is no, then entering step (9.6);
- (9.5) if the answer in step (9.3) is yes, then adding a constant to each element having the right to join bandwidth allocation in said rate matrix until one or more elements are unnecessary to join the bandwidth allocation any more; then entering step (9.2); and
- (9.6) ending.

10. The method of claim 1, further comprising steps of virtual output queuing as follows before all steps:
- (10.1) dividing each input buffer into k×N virtual output queues, wherein k represents the number of service grades of said crossbar switch;
- (10.2) storing an input packet in a corresponding virtual output queue according to the series number of said output port; and
- (10.3) a packet being read out from the corresponding virtual output queue.

11. The method of claim 10, wherein said plurality of virtual output queues are implemented by a memory means; each input packet is stored at a specific memory address corresponding to the series number of the virtual output queue, and also each packet is read out from a specific memory address corresponding to the series number of the virtual output queue.

12. A switching apparatus using bandwidth decomposition, applied in packet switching of a network system, comprising:
- a rate-measuring mechanism for dynamically measuring input rate of said switching apparatus;
- a plurality of input ports, connected to said rate-measuring mechanism, including a plurality of storing devices for storing input packets;
- a crossbar switch, connected to said plurality of input ports, used to transmit said input packets to output ports of said switching apparatus using bandwidth decomposition; and
- a processing mechanism, connected to said rate-measuring mechanism for transforming a rate matrix into connection patterns of said crossbar switch in any time slot of a cycle time, wherein the cycle time represents the time needed to transmit a fixed number of input packets.

13. The apparatus of claim 12, wherein said processing mechanism comprises:
- a processing unit for decomposing said rate matrix into a linear combination of a plurality of permutation matrices, and each one of said plurality of permutation matrices corresponding to a connection pattern of said crossbar switch; and
- a control unit for setting the connection patterns of said crossbar switch in one time slot.

14. The apparatus of claim 13, wherein said control unit comprises:
- a plurality of registers for storing said plurality of connection patterns;
- a multiplexer connected to said plurality of registers for outputting one of said plurality of connection patterns; and
- a selecting mechanism for generating control signals of said multiplexer based on a Packetized Generalized Processor Sharing algorithm.

15. The apparatus of claim 14, wherein said selecting mechanism comprises:
- a plurality of dividers for generating reciprocals of coefficients of the linear combination of said permutation matrices as virtual finishing times corresponding to said plurality of permutation matrices;
- a plurality of selecting registers, connected to said plurality of dividers and an adder for storing the content of said plurality of dividers in the first time slot of one cycle time and storing the content of said adder in other time slots of the cycle time;
- a register file, connected to said plurality of dividers for storing the virtual finishing time generated by said dividers;
- a sorter, connected to said plurality of selecting registers for generating the smallest virtual finishing time stored in the plurality of selecting registers and the series number of said selecting register storing the smallest virtual finishing time; and
- an adder, connected to said sorter and said register file for updating the virtual finishing time stored in one selecting register which owns the smallest virtual finishing time in a time slot.

16. The apparatus of claim 12, wherein said plurality of storing devices of said input ports can be implemented by a memory means.

17. The apparatus of claim 16, wherein said plurality of storing devices can be divided into k×N virtual output queues, wherein k represents the number of service grades of said crossbar switch, N represents the number of input ports of said switching apparatus; each input packet is stored in one of the virtual output queues of said switching apparatus corresponding to the series number of the output port.

* * * * *